Feb. 14, 1961   C. A. L. RUHL   2,971,524
VALVE
Filed Feb. 17, 1958
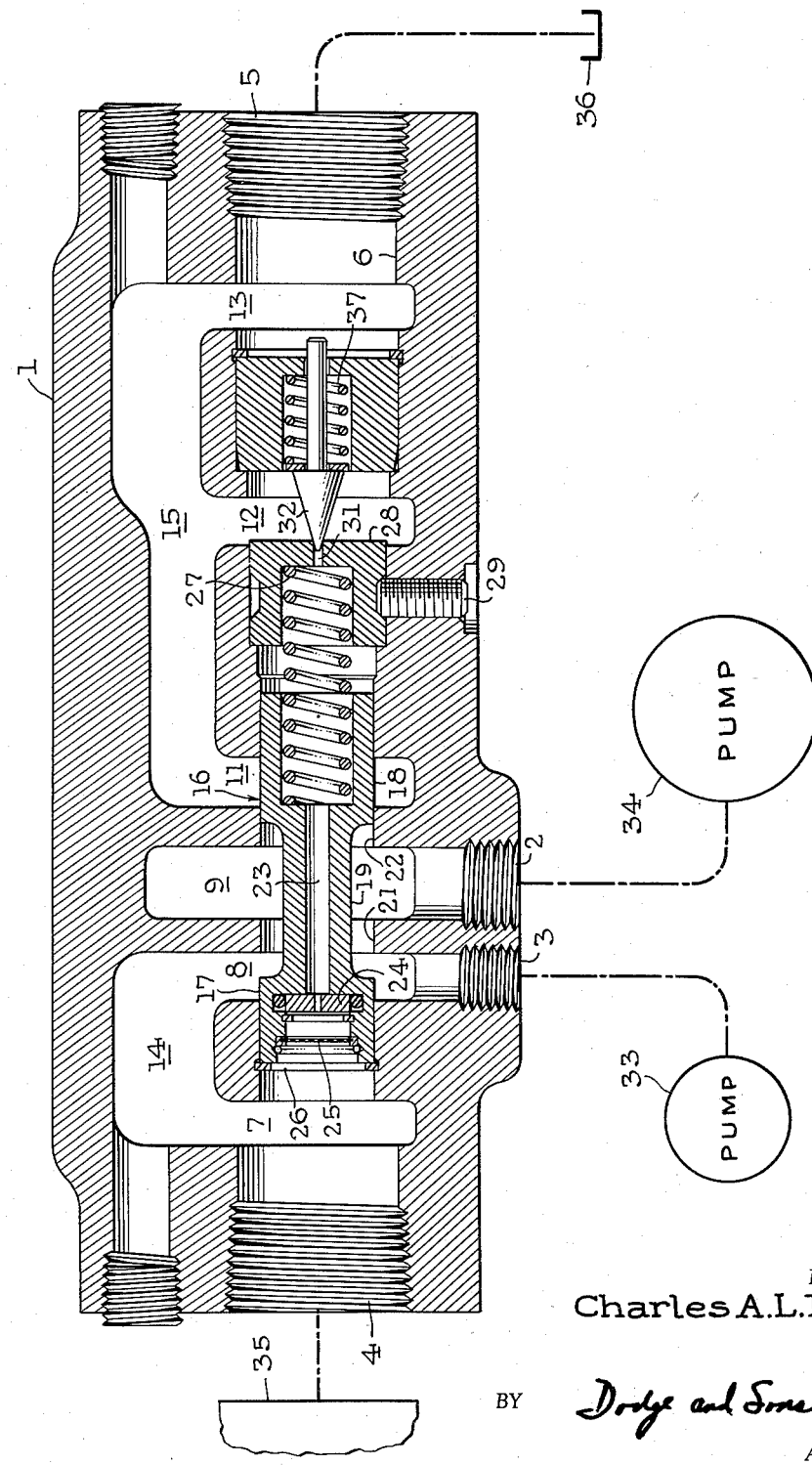
INVENTOR
Charles A. L. Ruhl
BY  Dodge and Sons
ATTORNEYS

United States Patent Office 2,971,524
Patented Feb. 14, 1961

2,971,524

VALVE

Charles A. L. Ruhl, Kalamazoo, Mich., assignor to The New York Air Brake Company, a corporation of New Jersey Filed Feb. 17, 1958, Ser. No. 715,627

5 Claims. (Cl. 137—108)

This invention relates to fluid supply systems and more particularly to a system for delivering fluid from two sources to a closed-center distributing valve.

The object of the invention is to provide a system of this type in which one of the sources is automatically unloaded when the closed-center valve is in its neutral position. In the preferred form of the invention this object is accomplished by an unloading device having two inlet ports, one connected with a large capacity pump and the other connected with a small capacity pump, an outlet port connected with the closed-center distributing valve, and an exhaust port connected with a sump. A control passage, passing through a metering orifice and thence through a relief valve, extends between the outlet port and the exhaust port. When the closed-center distributing valve is away from its neutral position, fluid from both inlet ports is transmitted to the outlet port. When the closed-center valve is moved to its neutral position, the pressures in the outlet port and in the control passage rise and the relief valve opens. Fluid flowing from the outlet port to the exhaust port through the control passage experiences a drop in pressure as it passes through the metering orifice, and this pressure drop is used to actuate an unloading valve which disconnects the large capacity pump from the outlet port and connects it to the exhaust port. In this way, the large capacity pump is unloaded at sump pressure and the small capacity pump is unloaded at the pressure established by the relief valve.

The preferred form of the invention will now be described in detail with reference to the accompanying drawing which includes a cross-sectional view of the unloading device, and schematic representations of the other system components with which it is used.

The unloading device comprises a housing 1 having two inlet ports 2 and 3, an outlet port 4, and an exhaust port 5. A through bore 6 extends between the outlet and exhaust ports 4 and 5, and spaced along this bore are six annular chambers 7 through 9 and 11 through 13. Passage 14 interconnects annular chambers 7 and 8, and passage 15 interconnects annular chambers 11 through 13.

A valve plunger 16, having two valve lands 17 and 18 separated by an annular groove 19, reciprocates in the bore 6. The valve lands 17 and 18 cooperate with seat lands 21 and 22, respectively, to control communication between annular chambers 8 and 9 and between annular chambers 9 and 11. An axial bore 23 is formed in the plunger 16 and mounted in this bore is a metering orifice plate 24 which is held in place by a snap ring, as shown. A filter screen 25 is mounted upstream of the orifice plate 24 and is held in place in bore 23 by a snap ring, as shown. The valve plunger 16 is urged into contact with a stop ring 26 seated in housing 1 by a coil spring 27 whose opposite end is seated against the bottom of a counterbore formed in cylindrical block 28. The block 28 is held in position in bore 6 by set screw 29. Passage 31, which extends through the block 28, is normally closed by a relief valve 32.

In operation, the small and large capacity pumps 33 and 34, respectively, are connected with inlet ports 3 and 2. Outlet port 4 is connected with a closed-center control valve 35 and exhaust port 5 is connected with a sump 36. Pressure fluid delivered by the small capacity pump 33 is transmitted to outlet port 4 by way of inlet port 3, annular chamber 8, passage 14 and annular chamber 7. When the closed-center control valve is out of its neutral position, pressure fluid from the large capacity pump 34 is also transmitted to outlet port 4; this fluid passing through inlet port 2, annular chamber 9, plunger groove 19, annular chamber 8, passage 14, and annular chamber 7.

When the closed-center distributing valve 35 is shifted to its neutral position, flow through outlet port 4 will cease and consequently the pressure in this port and in the passage 31 extending through cylindrical block 28 will rise. When this pressure is sufficient to overcome the force of relief valve spring 37, relief valve 32 will move to the right, opening the passage 31 and permitting flow from annular chamber 7 to the sump 36 via orifice plate 24, axial passage 23, passage 31, annular chamber 12, passage 15, annular chamber 13 and exhaust port 5. As fluid flowing along this path passes through orifice plate 24, it experiences a drop in pressure thereby creating a pressure differential along valve plunger 16. Since the right and left ends of this plunger are of equal cross-sectional area, this pressure differential develops a force acting to the right and tending to move the valve plunger against the bias of spring 27. As valve plunger 16 moves to the right, valve land 17 overtravels seat land 21 and valve land 18 clears seat land 22. This action interrupts flow between annular chambers 8 and 9 and establishes flow between annular chambers 9 and 11. Large capacity pump 34, therefore, is unloaded to sump 36 along a path including annular chambers 9, 11 and 13, and passage 15.

If closed-center distributing valve 35 is now shifted away from its neutral position, the pressure in outlet port 4 and in passage 31 will decrease, and relief valve 32 will close. When this happens, the pressures acting on opposite ends of valve plunger 16 will be equal and spring 27 will move this plunger to the position shown in the drawing. The unloading path for large capacity pump 34 across seat land 22 is thus interrupted, and this pump is again connected to outlet port 4 by the path previously described.

As stated before, the drawing and description relate only to a preferred embodiment of the invention. Since many changes can be made in this embodiment without departing from the inventive concept, the following claims should provide the sole measure of the scope of the invention.

What is claimed is:

1. In a hydraulic system having primary and secondary sources of pressure fluid, a common delivery passage, and an exhaust passage, the combination of primary and secondary supply passages connecting the delivery passage with the primary and secondary sources, respectively; a control passage connecting the delivery passage with the exhaust passage; a relief valve normally interrupting flow from the delivery passage to the exhaust passage through the control passage; an unloading passage connecting the primary supply passage with the exhaust passage; first and second valves controlling flow through the primary supply passage and the unloading passage, respectively, the first valve being located in the primary supply passage downstream of the junction between this passage and the unloading passage; and means responsive to flow through the control passage for opening and closing the second and first valves, respectively, when the relief valve is open, and for shifting these valves in the reverse senses when the relief valve is closed.

2. In a hydraulic system having primary and secondary sources of pressure fluid, a common delivery passage, and an exhaust passage, the combination of primary and secondary supply passages connecting the delivery passage with the primary and secondary sources, respectively; a control passage connecting the delivery passage with the exhaust passage; a relief valve normally interrupting flow from the delivery passage to the exhaust passage through the control passage; an unloading passage connecting the primary supply passage with the exhaust passage; an unloading valve controlling flow through the primary supply passage and through the unloading passage, and having a first limiting position in which it establishes communication between the primary supply passage and the delivery passage and interrupts communication between the primary supply passage and the unloading passage, and a second limiting position in which it establishes communication between the primary supply passage and the unloading passage and interrupts communication between the primary supply passage and the delivery passage; resilient means biasing the unloading valve toward its first limiting position; and control means responsive to the rate of flow through the control passage for shifting the unloading valve toward its second limiting position against the bias of the resilient means when the relief valve is open.

3. The combination defined in claim 2 in which the control means comprises a metering orifice located in the control passage upstream of the relief valve, and a double-acting movable abutment connected with the unloading valve and subject in opposite directions to the pressures upstream and downstream of the orifice.

4. A valve comprising a housing having primary and secondary inlet ports, an outlet port and an exhaust port; primary and secondary supply passages connecting the outlet port with the primary and secondary inlet ports, respectively; a control passage connecting the outlet port with the exhaust port; a relief valve normally blocking flow from the outlet port to the exhaust port through the control passage; an unloading passage connecting the primary inlet port and the exhaust port; an unloading valve controlling flow through the primary supply passage and through the unloading passage, and having a first limiting position in which it establishes communication between the primary inlet port and the outlet port through the primary supply passage and interrupts communication between the primary inlet port and the exhaust port through the unloading passage, and a second limiting position in which it establishes communication between the primary inlet port and the exhaust port through the unloading passage and interrupts communication between the primary inlet port and the outlet port through the primary supply passage; resilient means biasing the unloading valve toward its first limiting position; and control means responsive to the rate of flow through the control passage for moving the unloading valve toward its second limiting position against the bias of the resilient means when the relief valve is open.

5. The valve defined in claim 4 in which the unloading valve is a plunger valve having an axial passage constituting a portion of the control passage upstream of the relief valve; and wherein the control means comprises a metering orifice carried by the plunger valve and located in the axial passage, and the opposite ends of the plunger valve on which the pressures upstream and downstream of the orifice act.

References Cited in the file of this patent
UNITED STATES PATENTS

| | | |
|---|---|---|
| 1,995,480 | Murphy | Mar. 26, 1935 |
| 1,998,223 | Czarnecki | Apr. 16, 1935 |
| 2,277,490 | Huber | Mar. 24, 1942 |